US010356317B2

(12) United States Patent
Schechner et al.

(10) Patent No.: US 10,356,317 B2
(45) Date of Patent: Jul. 16, 2019

(54) WIDE-SCALE TERRESTRIAL LIGHT-FIELD IMAGING OF THE SKY

(71) Applicant: Technion Research & Development Foundation Limited, Haifa (IL)

(72) Inventors: Yoav Y. Schechner, Haifa (IL); Dmitri Veikherman, Nes Tziona (IL); Amit Aides, Kiriat Bilalik (IL)

(73) Assignee: Technion Research & Development Foundation Limited, Haifa (IL)

( * ) Notice: Subject to any disclaimer, the term of this patent is extended or adjusted under 35 U.S.C. 154(b) by 374 days.

(21) Appl. No.: 14/922,461

(22) Filed: Oct. 26, 2015

(65) Prior Publication Data

US 2016/0127642 A1    May 5, 2016

Related U.S. Application Data

(60) Provisional application No. 62/072,871, filed on Oct. 30, 2014.

(51) Int. Cl.
  *H04N 5/232* (2006.01)
  *G02B 27/42* (2006.01)
  (Continued)

(52) U.S. Cl.
  CPC ........ *H04N 5/23238* (2013.01); *G01J 3/0289* (2013.01); *G01J 3/18* (2013.01); *G01J 3/2823* (2013.01); *G02B 13/06* (2013.01); *G02B 27/4294* (2013.01); *G03B 37/04* (2013.01); *H04N 5/23206* (2013.01);
  (Continued)

(58) Field of Classification Search
  CPC ........... H04N 5/23238; H04N 13/0242; H04N 17/002; H04N 5/247; H04N 5/23206; H04N 13/243; G03B 37/04; G02B 13/06; G02B 27/4294; G01J 3/2823; G01J 3/0289; G01J 3/18
  See application file for complete search history.

(56) References Cited

U.S. PATENT DOCUMENTS

| | | | |
|---|---|---|---|
| 6,035,710 A * | 3/2000 | Hutchison | G01W 1/08 702/3 |
| 8,264,675 B1 * | 9/2012 | Danyluk | G01B 11/168 356/33 |

(Continued)

OTHER PUBLICATIONS

Allmen, M.C., Kegelmeyer Jr., P.: The computation of cloud base height from paired whole-sky imaging cameras. Machine Vision and Applications 9 (1997) 160-165 (78 pages).
(Continued)

*Primary Examiner* — Joseph Suh
(74) *Attorney, Agent, or Firm* — Roach Brown McCarthy & Gruber, P.C.; Kevin D. McCarthy

(57) ABSTRACT

A system for wide-scale light field imaging comprising: a network of multiple terrestrial cameras positioned at multiple known locations, where each of the cameras comprises a wide-angle lens directed towards the sky and configured to capture one or more images of the sky, and a processor configured to operate a wired and/or wireless communications infrastructure for transmitting the captured images; and a server configured to receive the wirelessly transmitted images and jointly process the received images, thereby producing a wide-scale light field image of the sky.

20 Claims, 17 Drawing Sheets

(51) Int. Cl.
| | |
|---|---|
| G02B 13/06 | (2006.01) |
| G01J 3/28 | (2006.01) |
| H04N 5/247 | (2006.01) |
| H04N 17/00 | (2006.01) |
| G03B 37/04 | (2006.01) |
| G01J 3/02 | (2006.01) |
| G01J 3/18 | (2006.01) |
| H04N 13/243 | (2018.01) |

(52) U.S. Cl.
CPC ........... *H04N 5/247* (2013.01); *H04N 13/243* (2018.05); *H04N 17/002* (2013.01)

(56) References Cited

U.S. PATENT DOCUMENTS

| | | | | |
|---|---|---|---|---|
| 9,001,226 | B1* | 4/2015 | Ng | H04N 5/23203 348/211.11 |
| 2007/0188621 | A1* | 8/2007 | Kitagawa | H04N 1/00127 348/211.99 |
| 2008/0017784 | A1* | 1/2008 | Hoot | G01S 3/7861 250/203.4 |
| 2008/0027649 | A1* | 1/2008 | Oertel | G01V 8/00 702/5 |
| 2009/0012734 | A1* | 1/2009 | Zhang | B64G 1/361 702/95 |
| 2009/0262621 | A1* | 10/2009 | Saito | B82Y 10/00 369/53.41 |
| 2010/0294337 | A1* | 11/2010 | Sherman | F24J 2/38 136/246 |
| 2012/0213411 | A1* | 8/2012 | Nozaki | H04N 5/235 382/103 |
| 2013/0307937 | A1* | 11/2013 | Kim | H04N 5/23264 348/47 |
| 2013/0321581 | A1* | 12/2013 | El-Ghoroury | H04N 13/0207 348/46 |
| 2014/0022337 | A1* | 1/2014 | Putraya | H04N 5/23238 348/36 |
| 2014/0104473 | A1* | 4/2014 | Kim | H01L 27/14627 348/308 |
| 2014/0292206 | A1* | 10/2014 | Lashina | H05B 37/029 315/149 |
| 2014/0313345 | A1* | 10/2014 | Conard | G06K 9/00664 348/169 |
| 2014/0357999 | A1* | 12/2014 | Martins | A61B 8/5269 600/441 |
| 2015/0041595 | A1* | 2/2015 | Hartmann | B64G 1/10 244/158.8 |
| 2015/0124175 | A1* | 5/2015 | Perkins | G02B 13/0095 348/759 |
| 2015/0125093 | A1* | 5/2015 | Jeong | G06T 5/005 382/284 |
| 2015/0146776 | A1* | 5/2015 | Koyama | H04N 19/593 375/240.03 |
| 2015/0189195 | A1* | 7/2015 | Hamann | G01S 3/7861 348/165 |
| 2016/0210756 | A1* | 7/2016 | Konishi | G06T 7/20 |
| 2017/0040036 | A1* | 2/2017 | Ryu | G11B 27/031 |

OTHER PUBLICATIONS

Cazorla, a., Olmo, F.J., Aladosarboledas, L., Alados-Arboledas, L.: Using a sky imager for aerosol characterization. Atmospheric Environment 42 (2008) 2739-2745 (7 pages).

Jacobs, N., King, J., Bowers, D., Souvenir, R.: Estimating cloud maps from outdoor image sequences. In: Proc. IEEE WACV (2014) (8 pages).

Kassianov, E., Long, C., Christy, J.: Cloud-base-height estimation from paired ground-based hemispherical observations. J. Applied Meteorology 44 (2005) 1221-1233 (13 pages).

Long, C.N., Sabburg, J.M., Calbo, J., Pages, D., Calbó, J., Pagès, D.: Retrieving cloud characteristics from ground-based daytime color all-sky images. J. Atmospheric and Oceanic Technology 23 (2006) 633-652 (20 pages).

Peng, Z., Yoo, S., Yu, D., Huang, D., Kalb, P., Heiser, J.: 3D cloud detection and tracking for solar forecast using multiple sky imagers. In: Proc. ACM Sympos. Applied Computing (2014) 512-517 (6 pages).

Seiz, G., Baltsavias, E., Gruen, A.A.: Cloud mapping from the ground: Use of photogrammetric methods. Photogrammetric Eng. and Remote Sensing 68 (2002) 941-951 (11 pages).

Seiz, G., Davies, R.: Reconstruction of cloud geometry from multi-view satellite images. Remote Sensing of Environment 100 (2006) 143-149 (7 pages).

Seiz, G., Shields, J., Feister, U., Baltsavias, E.P., Gruen, A.: Cloud mapping with ground-based photogrammetric cameras. Int. J. Remote Sens. 28 (2007) 2001-2032 (33 pages).

Yamashita, M.: Cloud cover estimation using multitemporal hemisphere imageries. In: Proc. XXth Congress of the Society for Photogrammetry and Remote Sensing (2004) 818-821 (4 pages).

* cited by examiner

WIDE-SCALE TERRESTRIAL LIGHT-FIELD IMAGING OF THE SKY

FIELD OF THE INVENTION

The invention relates to the field of light field imaging.

BACKGROUND

A variety of spaceborne and/or airborne instruments have been applied to spatio-angularly sample and image atmospheric radiance.

These include the Multiangle Imaging SpectroRadiometer (MISR) disclosed in Multi-angle Imaging Spectro-radiometer (MISR) Instrument Description and Experiment Overview, IEEE Trans. Geoscience and Remote Sens. 36 (1998) 1072-1087, and Atmospheric Transmittance from Spacecraft Using Multiple View Angle Imagery, Appl. Opt. 24 (1985) 3503-3511; Airborne Multiangle SpectroPolarimetric Imager (AirMSPI) disclosed in Dual-photoelastic-Modulator-Based Polarimetric Imaging Remote Sensing, Appl. Opt. 46 (2007) 8428-8445, and First Results from a Dual Photoelastic-Modulator-Based Polarimetric Camera, Appl. Opt. 49 (2010) 2929; and POLDER disclosed in Polarimetric Remote Sensing of Ocean Waves, In:Proc. MTS/IEEE OCEANS (2009) 1-5, An Analytical Model for the Cloud-Free Atmosphere/Ocean System Reflectance. Remote Sensing of Environment 43 (1993) 179-192, and The Compact High Resolution Imaging spectrometer (CHRIS): The Future of Hypersepctral Satellite Sensors. Imagery of Oostende Coastal and Inland Waters, In:Proc. Airborne Imaging Spectroscopy Workshop (2004).

However, these imaging architectures have a spatial resolution of several kilometers per pixel, an angular resolution of approximately 7 angles per view, and their orbit requires several days to return to the same terrestrial spot. Furthermore, spaceborne instruments are extremely expensive and unscalable.

Thus, existing sky-imaging systems rely on expensive, high quality cameras and components. Due to their complexity and cost, they typically provide an estimate cloud-base mapping over narrow regions above a narrow-baseline camera pair.

Other systems for providing a three-dimensional (3D) mapping of cloud-tops include satellite-based MISR which may take several minutes to capture multiple viewpoints of a region, during which the clouds may move. Weather radars that are used to sense raindrops, which are much larger than cloud-drops and ice crystals, do not sense clouds that do not produce rain. The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a system for wide-scale light field imaging, the system comprising: a network of multiple terrestrial cameras positioned at multiple known locations, wherein each of said cameras comprises: a lens directed towards the sky and configured to capture one or more images of the sky, and a processor configured to operate a wired and/or wireless communications infrastructure for transmitting said captured images; and a server configured to receive said transmitted images and jointly process said received images, thereby producing a wide-scale light field image of said sky.

In some embodiments, the server is further configured to process said images by applying a regional stationarity assumption for analyzing said received images.

In some embodiments, the cameras are geometrically calibrated with respect to a predefined position of an extraterrestrial object.

In some embodiments, the cameras are radiometrically calibrated with respect to a temporal median calculated for a color channel of said cameras.

In some embodiments, the cameras are radiometrically calibrated with respect to a median gain of said cameras.

In some embodiments, the server produces said field image of said sky by processing said received images, wherein said processing comprises estimating a background sky value from multiple images captured over multiple time instances and multiple viewpoints.

In some embodiments, the cameras are provided with a static sun blocker.

In some embodiments, the position and size of each of said static sun blockers of each one of said multiple cameras is configured to block the Sun's rays from directly illuminating said lens of said one camera.

In some embodiments, the each one of said sun blockers of said cameras corresponds to a blocked portion of said sky that is associated with said one sun blocker, and wherein at least another one of said cameras included in said network is configured to capture an image of said blocked portion of said sky associated with said one sun blocker, thereby producing said wide-scale light field image including all portions of said sky.

In some embodiments, the wide-field light image of said sky is a three dimensional estimation of a cloud field of said sky.

In some embodiments, the server is further configured to compare said produced light field image of said sky against a simulated image of said sky.

In some embodiments, the server is further configured to produce a light field image of said sky with respect to one of said cameras, and compare said produced light field image to a light field image collected by said camera.

In some embodiments, the system further comprises a diffraction grating positioned in a field of view of at least one of said cameras thereby dispersing one or more incoming light rays to measure a spectra of said incoming light rays.

In some embodiments, the server is further configured to process said received images thereby determining that an object that is expected to be indicated by a given pixel corresponding to an incoming light ray r, is not indicated by the pixel because a cloud is blocking said ray.

There is provided, in accordance with an embodiment, a method for wide-scale light field imaging, the method comprising: positioning a network of multiple terrestrial cameras at multiple known locations; capturing one or more images of the sky via a lens directed towards the sky that is configured with each of said cameras; transmitting said captured images, via a processor that is configured with each of said cameras to operate a wired and/or wireless communications infrastructure, to a server that is configured to jointly process said received images, thereby producing a wide-scale light field image of said sky.

In some embodiments, the method further comprises processing said images by applying a regional stationarity assumption for analyzing said received images.

In some embodiments, the method further comprises geometrically calibrating said cameras with respect to a predefined position of an extraterrestrial object.

In some embodiments, the method further comprises radiometrically calibrating said cameras with respect to a temporal median calculated for a color channel of said cameras.

In some embodiments, the method further comprises radiometrically calibrating said cameras with respect to a median gain of said cameras.

In some embodiments, the method further comprises producing said field image of said sky by processing said received images, wherein said processing comprises estimating a background sky value from multiple images captured over multiple time instances and multiple viewpoints.

In some embodiments, the method further comprises providing each of said cameras with a static sun blocker.

In some embodiments, the position and size of each of said static sun blockers of each one of said multiple cameras is configured to block the Sun's rays from directly illuminating said lens of said one camera.

In some embodiments, each one of said sun blockers of said cameras corresponds to a blocked portion of said sky that is associated with said one sun blocker, and wherein at least another one of said cameras included in said network is configured to capture an image of said blocked portion of said sky associated with said one sun blocker, thereby producing said wide-scale light field image including all portions of said sky.

In some embodiments, the method further comprises estimating a three dimensional cloud field of said sky to produce said wide-field light image of said sky.

In some embodiments, the method further comprises comparing said produced light field image of said sky against a simulated image of said sky.

In some embodiments, the method further comprises producing a light field image of said sky with respect to one of said cameras, and comparing said produced light field image to a light field image collected by said camera.

In some embodiments, the method further comprises positioning a diffraction grating in a field of view of at least one of said cameras thereby dispersing one or more incoming light rays to measure a spectra of said incoming light rays.

In some embodiments, the method further comprises processing said received images thereby determining that an object that is expected to be indicated by a given pixel corresponding to an incoming light ray r, is not indicated by the pixel because a cloud is blocking said ray.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figures 1A, 1B:
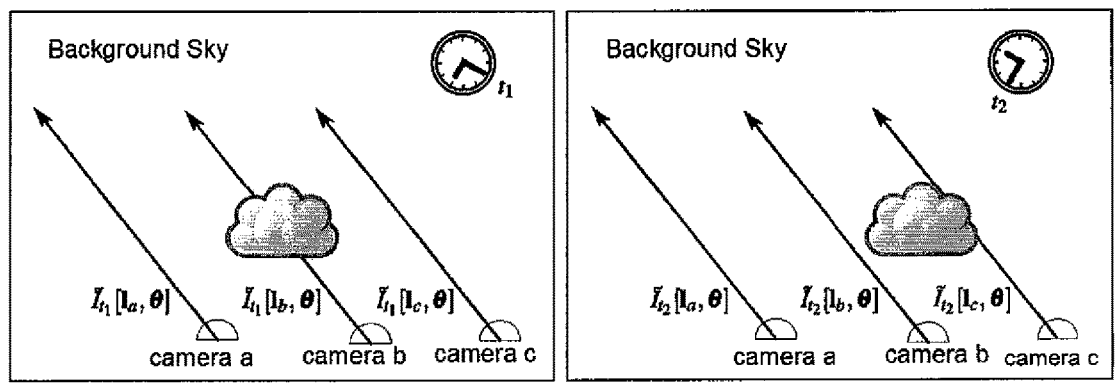
FIGS. 1A-B illustrates an application of a regional stationarity assumption for analyzing multiple obtained images from multiple viewpoints, in accordance with an embodiment of the invention.

A system for wide-scale light-field imaging to sense the sky is disclosed herein. The system may comprise a network of multiple terrestrial camera nodes that may be deployed over a wide area. The cameras may be positioned on the surface of the earth and/or on earthly structures at multiple known locations. The cameras may be positioned with fixed structures, such as buildings, or with mobile structures, such as cars or aircraft flying within the Earth's atmosphere.

Each camera may have a wide-angle, such as a hemispherical lens, facing upwards towards the sky for capturing one or more images of the sky. In an embodiment, the lens may be polarized. The cameras may each include a processor for operating a wired and/or wireless, such as cellular-based, communications unit provided with the cameras, enabling transmitting the captured images, via a wired and/or wireless infrastructure, such as a cellular-network infrastructure, to one or more servers for analyzing the collected light-field data. The server may jointly process the images received from the cameras and produce a wide-scale light field image of the sky. In an embodiment, the server may provide cloud computing services for analyzing the collected light-field data.

Thus, an atmospheric lightfield may be captured by positioning multiple wide-angle sky-facing cameras on the Earth's surface. By providing a scalable sensor network of cameras, multiple images may be captured simultaneously from a large area over predetermined time intervals, such as every few seconds, minutes, hours, etc. The redundancy provided by the network comprising consistent units may ensure proper alignment performance, eliminating dead-regions, and offer operational robustness over long periods.

The network may comprise multiple cameras that span any region that is within communication distance of a wireless communication network, thereby providing a high spatio-temporal resolution three-dimensional (3D) imaging system of a continent-wide light-field. Such a light-field system may be used to create a 3D map over time of the Earth's atmosphere for analyzing cloud cover, lightning, bird migration patterns, aviation meteorology, aerosol tomography, and/or other atmospheric applications.

The 3D imaging obtained by the network may be used in conjunction with multi-angular satellite imagery for any of the above mentioned applications.

By extending monocular tasks to a network configuration, several new computational vision and photography problems may be introduced, such as but not limited to radiometric self-calibration across a network, overcoming saturation and flare by a network, and background estimation.

In an embodiment, the cameras may be basic, low-cost cameras with coarse alignment tolerances.

In an embodiment, spectra of incoming light rays, such as sunlight or skylight, may be measured by positioning a diffraction grating in a field of view of at least one of the cameras in place of the sun blocker to disperse the incoming light rays.

In an embodiment, the server may process the received images and determine that a known object, such as a planet, or star that is expected to be indicated by a given pixel corresponding to an incoming light ray r, is not indicated by the pixel because a cloud is blocking the light ray r.

Reference is now made to FIGS. 1A-B which illustrate an application of a regional stationarity assumption for analyzing multiple obtained images from multiple viewpoints, in accordance with an embodiment of the invention.

A network of sky-observing cameras a, b, and c is shown, where the location vectors for cameras a, b, and c are $l_a$, $l_b$ and $l_c$, respectivly. An image pixel x of the cameras may be backprojected to correspond a ray of light described by a direction-angle vector (zenith, azimuth) θ in a global coordinate system, and shown as multiple parallel arrows originating from the cameras projecting towards the sky. The sampled light-field may be represented by the radiance measured per location $l_a$, direction θ and time t, and given by $\tilde{I}_t [l_c, \theta(x)]$.

A regional stationarity assumption may be applied for analyzing any images captured by the cameras and received by the server, as follows: Over a wide region and common viewing angle θ, multiple cameras should detect the same color for a distant object, such as the background sky. For example, at time $t_1$, pixel x is observed by both cameras a and c as the distant sky, and thus, $\tilde{I}_{t1}[l_a, \theta(x)]$ may be equivalent to $\tilde{I}_{t1}[l_b, \theta(x)]$. However, nearby objects, such as clouds, may cause noticeable differences between measured pixel values for a given direction θ. For example, at time $t_1$, camera b may observe a cloud at pixel x while camera c may observe the distant sky, or, $\tilde{I}_{t1}[l_b, \theta(x)]$ may differ from $\tilde{I}_{t1}[l_c, \theta(x)]$.

Nevertheless, the light-field statistics, such as spatio-temporal variations and correlations, may be stationary across multiple viewpoints obtained from multiple cameras. This may enable statistical processing across multiple viewpoints over time, and any residual measured bias may be attributed to slight inter-camera radiometric inconsistencies. Thus, the chance of a cloud, clear sky, or haziness affecting $\tilde{I}_t[l_c, \theta(x)]$ may be independent of camera c, and inter-camera image variations due to atmospheric conditions may be assumed to be random and unbiased, as illustrated in FIGS. 1A-B.

Since images captured simultaneously by different camera nodes are generally different from each other, due to regional stationarity, a change of viewpoint may have an effect similar to change in time, and thus, a cloud detected in $\tilde{I}_t[l_c, \theta(x)]$ may not be detected in $\tilde{I}_t[l_b, \theta(x)]$. Consequently, images may be gathered over both time and viewpoint to provide statistics for processing the gathered images.

Prior to deploying the cameras in the field, the internal geometric and radiometric characteristics, such as distortions, and radiometric response, may be calibrated using established monocular methods. However, once the camera is placed in the field, unknown parameters may be introduced, such as external light sources in the vicinity of a camera that may create a weak lens glare offsetting a radiometric reading, and that may vary both spatially and across viewpoints. Moreover, despite prior calibration, residual gain variations may be present between different cameras. This may be exacerbated in the field due to dirt accumulated on the lenses. Since a large light-field network may include many cameras, estimating and compensating for inter-camera differences may aid subsequent computer vision algorithms. A solution is provided, based on multiple, redundant captured images from predetermined locations and viewpoints.

Figure 2C:
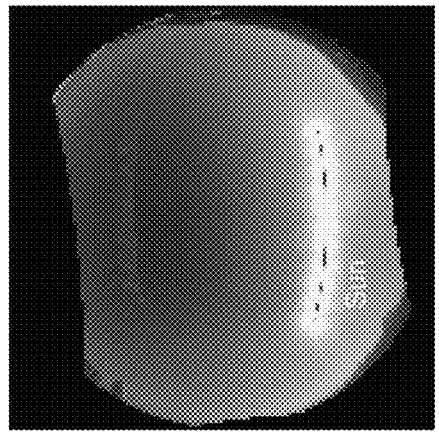
FIGS. 2A-C illustrates a method for geometric calibration of one or more cameras that are included in an light-field imaging network, with respect to an extra-terrestrial (XT) object, in accordance with an embodiment of the invention.
Figure 2B:
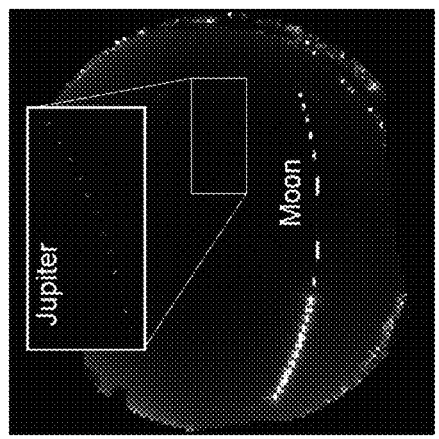
Figure 2A:
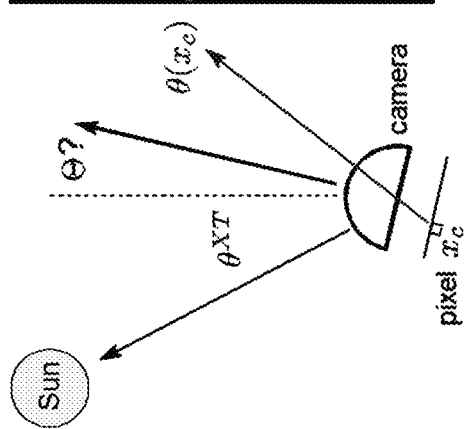

Reference is now made to FIGS. 2A-C, which illustrates a method for geometric calibration of one or more cameras that are included in an light-field imaging network, with respect to an extra-terrestrial (XT) object, in accordance with an embodiment of the invention.

The internal parameters $\Psi_c$ of a camera c may pre-calibrated, such as in a laboratory prior to deployment in the field. In the field, the location vector $l_c$ of the camera may be obtained by any suitable method, such as via a Global Positioning System (GPS) included with the camera. However, the orientation for the camera, such as yaw, pitch and roll angle vector $\Theta_c$, may be loosely set in the field. The orientation for the camera may be calibrated by automatically detecting and tracking the position of one or more extra-terrestrial (XT) objects for which the direction vector $\theta^{XT}(t)$ may be predefined and known for all t, such as illustrated in FIG. 2A which shows an angular displacement, or yaw-pitch-roll angle vector, $\Theta_c$ for a camera c. For example, a predefined position of the XT object may be obtained from an astronomical chart for time t and location $l_c$, and denoted as angle vector (zenith, azimuth) $\theta^{XT}(t)$ relative to a global coordinate system.

Reference is now made to FIG. 2B which is a photomontage of multiple night sky images showing observations of the moon at different times followed by the expected trajectory based on the estimated $\Theta_c$, as well a close-up on the corresponding sampled images of Jupiter, in accordance with an embodiment of the invention. The paths of the moon or planets as they traverse over the course of a night or day across the camera's field of view may be used to calibrate the camera.

Reference is now made to FIG. 2C, which is a photomontage of the multiple images of the sky obtained during the day as the Sun traverses across the camera's field of view, in accordance with an embodiment of the invention. The Sun may be observed at different hours, and the Sun's expected trajectory, based on the estimated $\Theta_c$ and lens-flares, may be used to calibrate the camera.

Given a camera orientation $\Theta_c$, a ray from $\theta^{XT}(t)$ may be expected to project to any given pixel as follows:

$$x_{model}^{XT}(t) = \Pi(\theta^{XT}(t); \Theta_c, \Psi_c), \quad (1)$$

where $\Pi$ denotes a projection that converts ray angles to image pixels. The pixel measured by camera c, $x_{measured}^{XT}(t)$, may have a degree of uncertainty due to the finite angular size of the XT object, and blooming artifacts. However, during the course of the day or night, multiple, such as O(100), frames $N^{frames}$ may be obtained for the XT object. An optimization formulation may be applied to determine an orientation $\Theta_c$ that provides a minimal difference between the measured positions and the predefined positions for the XT object, as follows:

$$\Theta_c = \underset{\Theta_c}{\operatorname{argmin}} \sum_{t=1}^{N^{frames}} P \Pi(\theta^{XT}(t); \Theta_c, \Psi_c) - x_{measured}^{XT}(t) P^2. \quad (2)$$

Eq. (2) may be solved using any suitable method, such as exhaustive search or gradient descent from null initialization.

Based on $\Theta_c$, captured images $\tilde{I}_{c,t}(x)$ taken by camera c may be aligned to the global coordinate system, where the backprojected ray may be described by direction vector $$\theta(x) = \Pi^{-1}(x; \Theta_x, \Psi_c). \quad (3)$$

A large network of low-cost camera units, may have spatial and/or temporal radiometric inconsistencies. For a single camera, consistent readouts may be obtained in the field by self-calibration, by using redundant images taken at modulated settings. Images taken during slow panning may yield spatial non-uniformity correction (NUC) of offset and gain, such as by vignetting. For example, spatial gain may be modeled by a function $M(x)$, where $x=(x, y)$ is a camera pixel. Thus the image pixel irradiance at time t is $$\tilde{I}_t(x) = M(x) I_t(O), \quad (4)$$

where $I_t(O)$ is the pixel irradiance when M=1, for observed object O.

Correspondence may be established between modulated readouts, such as. by aligning the pan sequence. Assuming a constant brightness, corresponding measurements may yield one or more constraints. Aggregating these constraints over different pixels and frames may recover parameters of radiometric inconsistencies, resulting in a consistent monocular pixel readout.

This principle may be expanded to a network of multiple cameras. For a fixed view direction $\theta$ observed by several cameras. The set $\{\tilde{I}_t[1_c, \theta]\}$, may correspond to multiple readouts of parallel rays, back-projected from the cameras in the network. Values in this set generally differ from each other, i.e. $\tilde{I}_t[1_c, \theta] \neq \tilde{I}_t[1_{c'}, \theta]$. This discrepancy may be caused by any combination of the following:

1. Different cameras positioned at different locations may capture different observed objects. For example, camera c may observe a cloud while camera b may observe a clear sky, or vice versa. Alternatively, camera b may momentarily observe a somewhat denser haze volume than c, etc. and
2. Slight inter-camera radiometric inconsistencies which need to be estimated may cause discrepancies in the capture images.

Cause (1) may be overcome by applying an assumption of regional stationarity, as described above.

Bias due to the camera and view angle $\theta$ may be due to cause (2). This bias may be detected and characterized by analyzing statistics of the captured images over time.

Reference is now made to FIGS. 3A-D which illustrate an exemplary statistical analysis of images captured by two cameras, a and b, over time period t for radiometric calibration, in accordance with an embodiment of the invention.

Figure 3B:
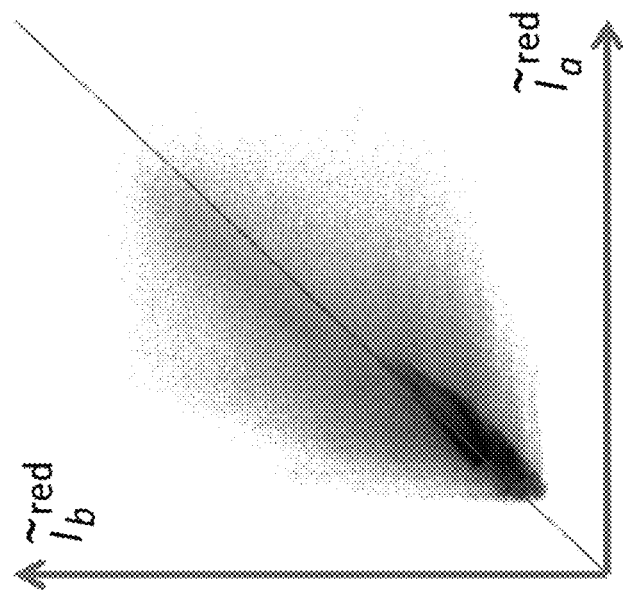
FIGS. 3A-D illustrate an exemplary statistical analysis of images captured by two cameras, a and b, over time period t for radiometric calibration, in accordance with an embodiment of the invention.
Figure 3A:
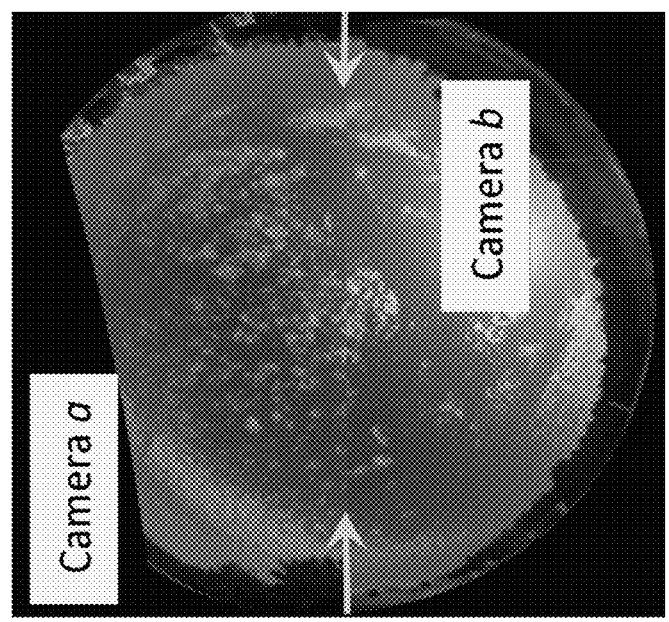

FIG. 3A shows a black and white rendition of a radiometrically inconsistent image comprising two combined half-images obtained by two cameras, a and b. The two half-images are shown with respect to the red-channel of the cameras. It may be noted that a similar analysis may be performed for additional channels of the cameras to correct for radiometric inconsistencies between the cameras.

The field of view of FIG. 3A is split into an upper and lower half, corresponding to the two cameras, and the pixels of the image correspond to either $\tilde{I}_t[1_a, \theta]$ corresponding to camera a, or $\tilde{I}_t[1_b, \theta]$, corresponding to camera b. In the line between the marked arrows, radiometric inconsistency is observed as a seam across which the colors of the respective pixels differ slightly. FIG. 3B illustrates a scatter-plot of the image data $\tilde{I}_t[1_a, \theta]$ vs. $\tilde{I}_t[1_b, \theta]$, $\forall t, \theta$, for the red-channel.

From such plots, it may be hypothesized that camera a has a slight offset vs. camera b. Per color channel, the map of radiometric offset across pixels, or ray-directions may be estimated by using a temporal median:

$$\hat{o}_{b-a}(\theta) = \operatorname{median}_t \{\tilde{I}_t[1_b, \theta] - \tilde{I}_t[1_a, \theta]\}. \quad (5)$$

The map $\hat{o}_{b-a}(\theta)$ may be spatially smoothed and used to correct $\tilde{I}_t[1_a, \theta]$, and thus Eq. (5) may be applied to radiometrically calibrate the cameras with respect to a temporal median calculated for a color channel of the cameras.

Figure 3D:
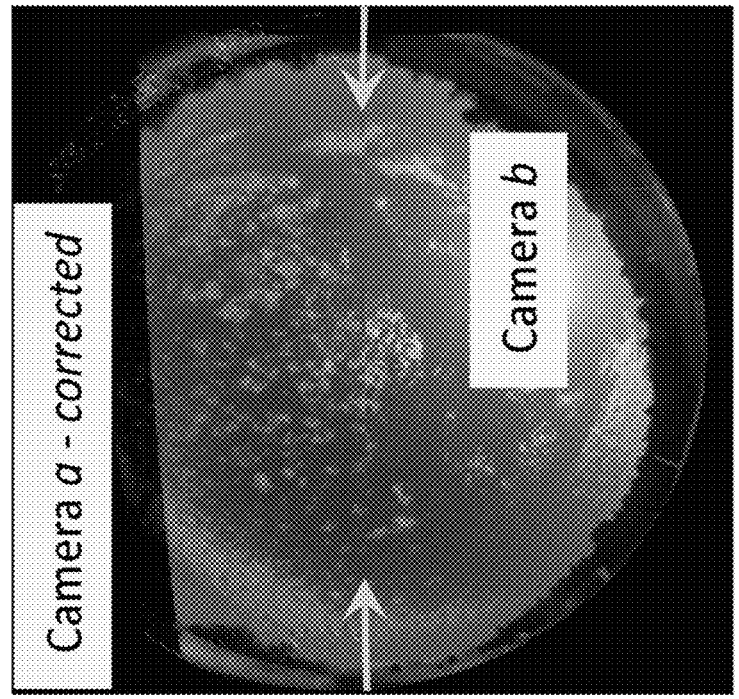
Figure 3C:
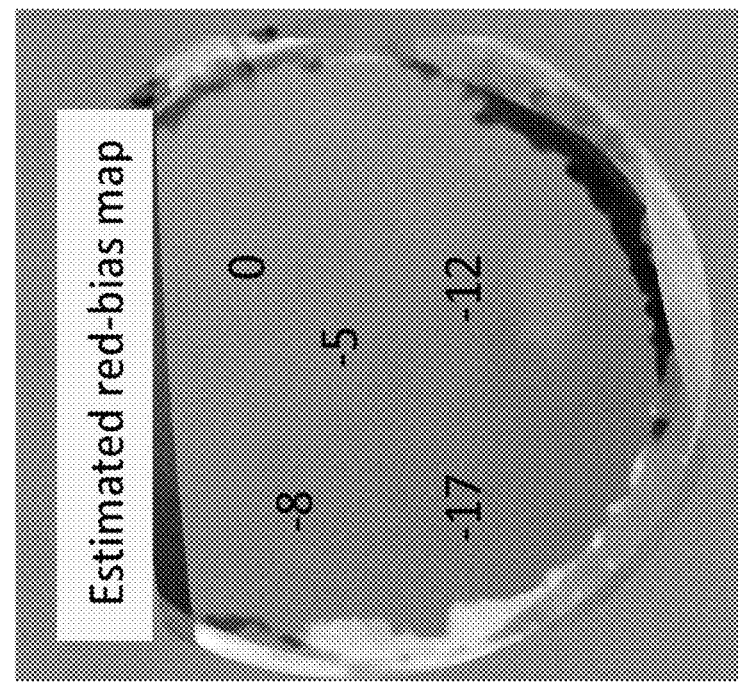

Referring to FIG. 3C, the estimated offset map $\hat{o}_{b-a}(\theta)$, or red channel as derived from a set of images taken over several hours is shown.

Referring to FIG. 3D, the results of the corrected image is shown having improved inter-camera consistency. The field of view is split into two portions that include the corrected pixels from either $\hat{I}_t[1_a, \theta]$ or $\hat{I}_t[1_b, \theta]$. As can clearly be seen, inconsistencies along the line between the marked arrows are greatly diminished.

A similar method may detect slight variations of gain, or vignetting, between the cameras. Assuming there is no gain offset, in analogy to Eq. (5), the gain for camera b may be higher than the gain for camera a by a factor:

$$\hat{M}_{b/a}(\theta) = \operatorname{median}_t \{\tilde{I}_t[1_b, \theta] / \tilde{I}_t[1_a, \theta]\}. \quad (6)$$

In this manner, the network may be radiometrically aligned to a single master camera. Thus Eq. (6) may be applied to radiometrically calibrate the cameras with respect to a median gain calculated for the cameras. After radiometric corrections, the light-field samples may be denoted as $\hat{I}_t[l_b, \theta]$.

Figures 4A, 4B:
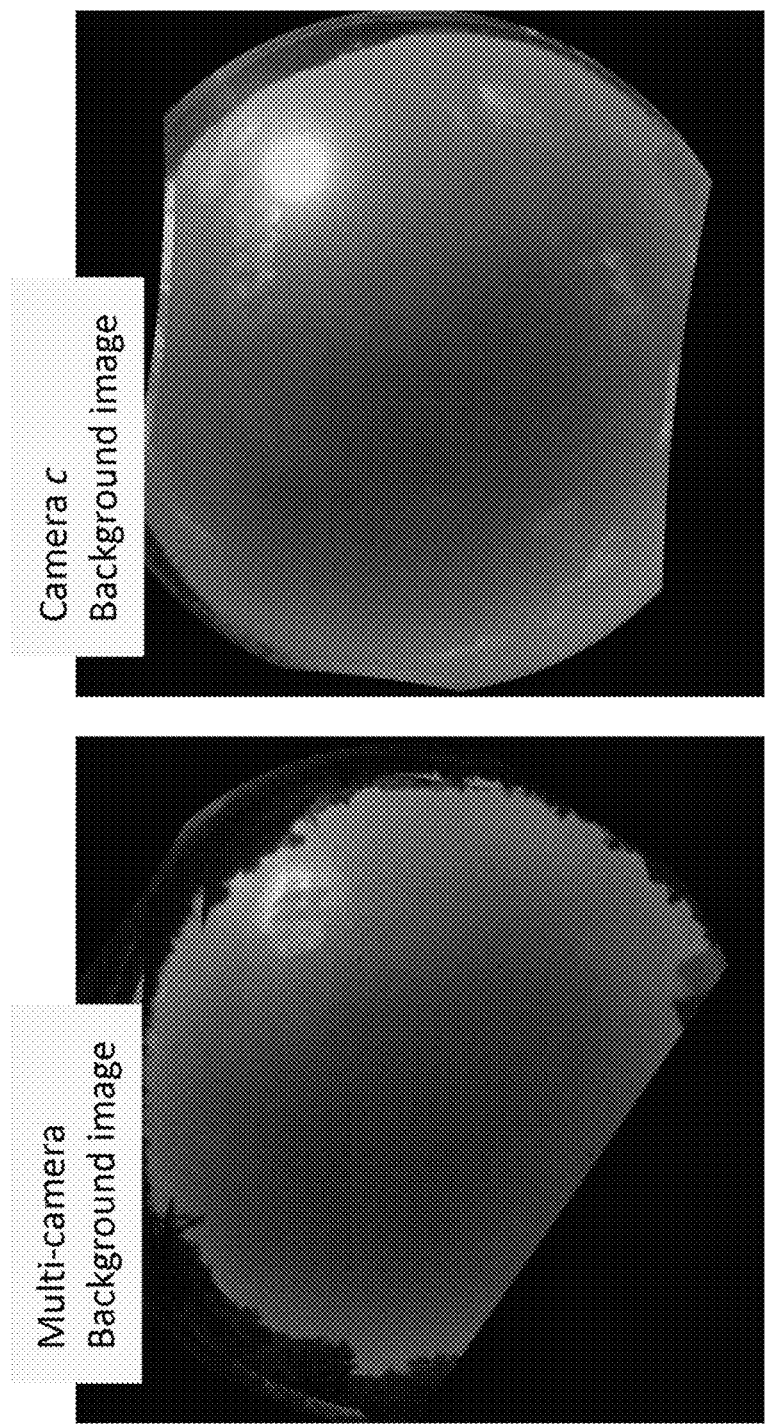
FIGS. 4A-B illustrate exemplary results of estimating a background sky value from multiple images captured over multiple time instances and multiple viewpoints, in accordance with an embodiment of the invention

Referrence is now made to FIGS. 4A-B which illustrate exemplary results of estimating a background sky value from multiple images captured over multiple time instances and multiple viewpoints, in accordance with an embodiment of the invention. The server may process the received images to estimate a characterization of a background portion of the images.

In a monocular setting, temporal filtering may be applied to characterize the background since foreground objects tend to be positioned at different locations at different times, such as clouds that move over time in the foreground. These objects may be detected by statistically analyzing the images over time, and pruned from the image, resulting in an image of the background without the foreground object.

Formulating this using the notation defined above, an object captured from a given viewpoint at time t, $\tilde{I}_t[l_c, \theta]$ may not be captured from the same viewpoint at time t', $\tilde{I}_{t'}[l_c, \theta]$, where t' ≠ t. However, if the objects move slowly across the field of view while illumination gradually changes, temporal filtering may be insufficient, as the foreground object may be present in the captured images at both t and t'.

For example, referring to FIG. 4B, an image of the background sky is shown that was produced from multiple images obtained at different temporal instances from the same viewpoint, or camera. Since the foreground object, in this case a cloud, may move slowly across the field of view of the camera while the images are captured, the foreground object may appear in each of the captured images. Thus, temporal filtering in this case may be ineffective in distinguishing the foreground object from the background sky, as the cloud is clearly visible in the constructed background image.

To solve this, a network-based principle may be applied, such as in conjunction with conventional monocular methods. For example, in broad daylight, clouds are brighter than the blue sky. An exemplary estimation for the sky background may be described as:

$$SKY(\theta) = \underset{t,c}{\mathrm{argmin}}\, \hat{I}_t[l_c, \theta] \quad (7)$$

where $t \in [1 \ldots N^{frames}]$ and $c \in [1 \ldots N^{views}]$.

Referring to FIG. 4A, a network of multiple cameras may enable more effective pruning of foreground images from the background. Applying an assumption of regional stationarity yields a similar effect when changing the viewpoint to capture an image as changing the temporal instance. Thus, a cloud appearing in an image captured by a camera c at time, t $\tilde{I}_t[l_c, \theta]$ may not appear in an image captured by a camera c' at time t, $\tilde{I}_t[l_{c'}, \theta]$. By capturing multiple images from multiple viewpoints by multiple cameras over multiple time instances, the foreground objects may be discernable from the background sky, since foreground objects may change their relative position, whereas background objects may remain stationary. Thus, a filter with respect to both time and viewpoint may be applied to the captured image to estimate the background portion of the images. This is clearly shown in FIG. 4A which illustrates an estimated sky background constructed from multiple images captured from multiple viewpoints by multiple cameras over multiple temporal instances. The foreground cloud objects are fewer, smaller, and less intense compared with those in FIG. 4B.

Reference is now made to FIGS. 5A-D which illustrate positioning one or more static sunblockers provided with one or more cameras to block the sun from the camera's field of view, in a accordance with an embodiment of the invention.

When capturing an image using a wide-angle sky-viewing camera, sun-rays are liable to shine directly into the lens and cause blooming artifacts, or create an additive, spatially varying lens-flare. Some prior art solutions for reducing lens flare require using a specialized detector array to distinguish nearby objects, or rotating the camera while imaging a static scene.

Consequently, some prior-art sky-observing wide-field cameras often require an expensive and complex motorized dynamic sun blocker to move in synchrony with the Sun's movement across the sky throughout the course of the day and year.

Each camera of the network may be provided with a static sun-blocker, where the term static is understood to mean that for at least a twenty four hour period, the sun blocker is stationary. In an embodiment, the sun blocker may be stationary throughout a day, however the sun blocker may move seasonally corresponding to the Sun's path across the sky. Such a sun blocker may be cheaper, simpler, and more robust than conventional cameras with dynamic sun-blockers. The blocker may cover the portion of the camera's field of view, such as the portion that is occupied by the Sun during the year or part of it, over some or all directions of the Sun's luminance onto the camera. The sun blocker may block a portion of the Sun's luminance onto the camera, such as at least 50%. In an embodiment, the sun blocker comprises a semi-opaque material, such as a mesh, that allows a portion of the Sun's rays to penetrate.

Figure 5A:
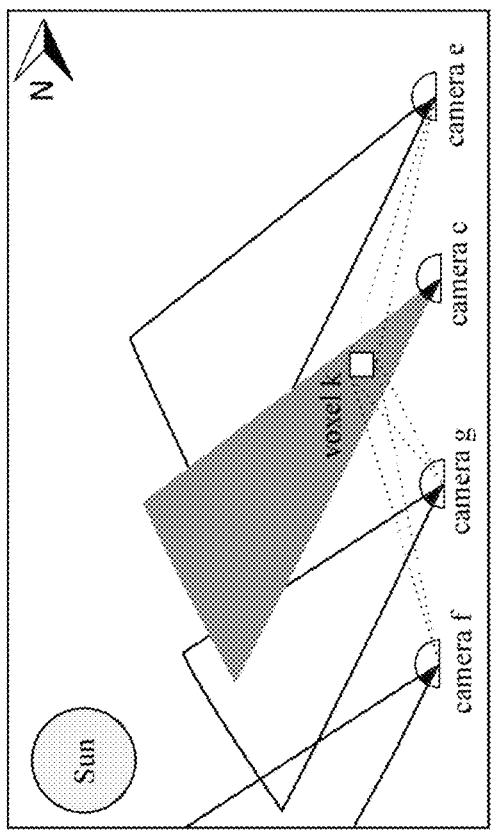
FIGS. 5A-E illustrate positioning one or more static sunblockers provided with one or more cameras to block the sun from the camera's field of view, in a accordance with an embodiment of the invention.
Figure 5B:
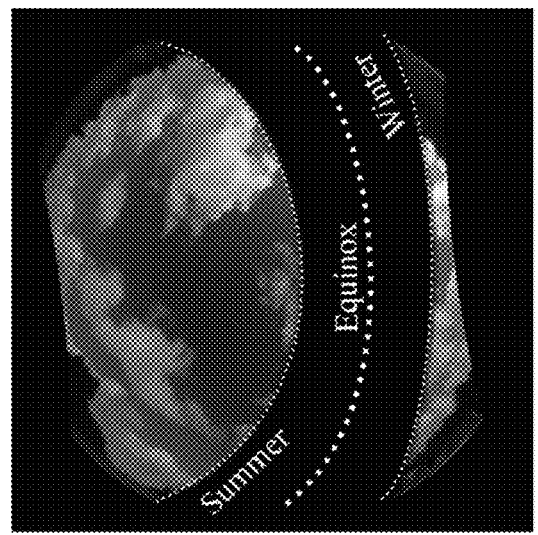

Thus, each camera unit may have a blind area blocking a portion of the sky, corresponding to the sun-blocker, as can be seen in FIG. 5B which shows a simulation of a whole sky image (polar azimuthal equidistant projection), with blocked solar directions over the course of the year, at a mid-latitude. Nevertheless, by providing multiple cameras positioned at multiple locations, at least one camera may capture any sky portion that may be blocked by a sun blocker of another camera. In this manner, redundancy provided by multiple cameras may compensate for any blind spots caused by the sun blockers, so that all portions of the sky may be included in the combined images captured by the cameras, resulting in a camera-network without any blind spots.

Referring to FIG. 5A, a static year-round sun-blocker on a camera c may permanently obstruct a set $\Gamma_c$ of atmospheric voxels, or three-dimensional pixels, corresponding to a blind-region of blocked Sun rays from directions $l_e$. However, the network as a whole may have coverage of voxels $k \in \Gamma_e$, as they are observed by cameras e, f, g. These voxels may be visible from several other cameras, such as cameras e, f, g shown in FIGS. 5A, and 5C-D. Thus, by positioning multiple cameras at different locations, all the voxels may be visible from at least some cameras, eliminating blind spots appearing in any individual camera as a result of the static sun-blocker.

At least one camera included in the network may be configured to capture an image of the blocked portion of the sky that is associated with a sun blocker of a different camera, thereby producing a wide-scale light field image that includes all the portion of the sky.

Figure 5C:
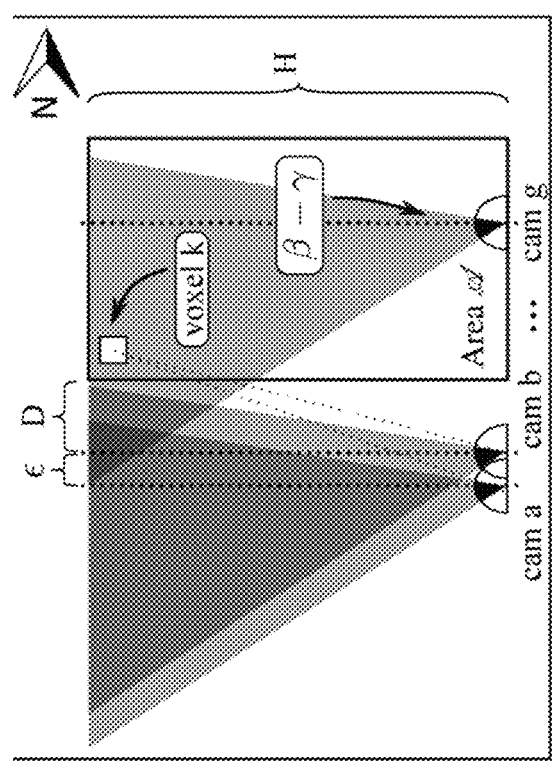
Figure 5E:
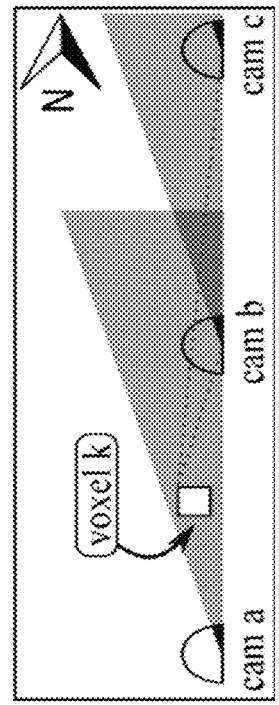
Figure 5D:
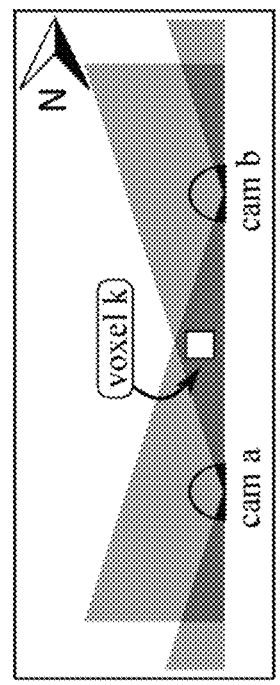

This approach may be extended to a network as follows, with reference to the northern hemisphere without loss of generality. Nearly all weather phenomena are under the tropopause, whose altitude H above sea level is typically 17 km at the equator, and decreasing with latitude. The solar seasonal angle amplitude is $\beta \approx 23.5°$. At latitude $\gamma$, thus, a permanent sun blocker spans zenith angles in the range $\gamma \pm \beta$. Earth is divided here to three region classes:

- As shown in FIG. 5C, In the tropics, the sky directly above a camera may be blocked. Consider a small tropical area A, e.g., 1 km wide, whose sky needs to be monitored. According to FIG. 5C, A may be efficiently observed without a blind spot by cameras located outside the surveyed area, if A is narrow. For example, the cameras may be located at positions to the south of A, extending to a distance $D=H \tan(\beta-\gamma)+\epsilon$ from A, where $\epsilon$ is a small distance, sufficient for triangulation at H, D may depend on the latitude $\gamma$, and $\beta \approx 23.5°$. At the equator $D \approx 7.4$ km. It can also be shown that if A is wider than $2H[\tan(\beta-\gamma)+\tan(\beta+\gamma)]$, the camera network may observe and triangulate the entire sky directly above it.
- As latitude increases towards the tropic circles, D decreases to zero. Thus the network can observe and triangulate all the sky right above it, anywhere outside the tropics, in the mid-latitudes.
- In the arctic and antarctic summer, the Sun can appear in all azimuth angles over the day, and thus the blind region is adjacent to the horizon, in all azimuth angles. A single 24-hour fixed sun-blocker over 360° may be provided to block the horizon. Thus, as shown in FIG. 5D, a low-horizon voxel k may not observed. One solution would be to mount two cameras, side by side, for each network node. Each camera in a node may have a fixed sun blocker that covers half of the azimuth angles, where one camera of the camera pair may operate in the polar daytime (local 6 AM to 6 PM), as it has a south-oriented fixed blocker, and the other camera may operate in the complementing time, as shown in FIG. 5E, having a north-oriented fixed blocker. In this manner, the voxel is observable by at least one of the cameras of the camera-pair, eliminating the blind spot. Thus arctic cameras fitted with a fixed north-facing sun blocker may create a network that operates 12 hours a day. An adjacent camera at each node may have a fixed south-facing sun blocker, for imaging during complementing hours.

Network-based acquisition and processing of sky imagery, as described above, may yield a calibrated sampled light-field of the sky. This light-field may be applied to estimate the 3D cloud structure above the network domain, and beyond. This may be done by the following steps:

(A) Per time t, give a cloud score s to each ray $[l_c, \theta]$, which will be described in greater detail below.

(B) Perform a fuzzy version of space carving, which is similar to back-projection in tomography.

To implement (B), the set of sampled light-field rays may be denoted by R, where $|R|=N^{rays}$. A ray may be indexed by r, and may correspond to a specific $[l_c, \theta]$. A voxel k may project to a subset of the rays $\rho_k \subset R$, that reach $v_k$ viewpoints. A cloud score $s(r) \in [0,1]$ may be assigned to a ray $r \in R$, where $s=0$ means there is a low probability that a cloud is positioned in the direction of r, and where $s=1$ means there is a high probability that a cloud is positioned in the direction of r. Per voxel k, a back-projected score may be defined as:

$$B_k = \left[\prod_{r \in \rho_k} s(r)\right]^{1/\rho_k} \text{ if } v_k \geq 2. \quad (8)$$

If k is not observed by at least two viewpoints, or if $s(r)=0$ for any $r \in \rho_k$, the back-projected score $B_k$ of voxel k is null. If all $r \in \rho_k$ have same score s, then $B_k=s$. Thus, equation (8) carves-out, or removes voxels that contradict support for clouds.

Different cloud regions may have signature appearances. Ignoring this would wrongly allow matching of, say, a darker cloud-bottom to a bright sun-lit side of a cloud, or a smooth cloud region to a textured one. Thus, photometric and appearance consistency across viewpoints may be incorporated, such as described in Kutulakos, K., Seitz, S.: A Theory of Shape by Space Carving, IJCV 38(2000), 199-218.

From the captured images, a feature vector v(r,t) may be extracted for any measured ray r, such as by using one or more Scale Invariant Feature Transform (SIFT) descriptors as described in Distinctive Image Features from Scale-Invariant Keypoints, IJVC 60 (2004), 91-110, as well as the radiance in each color channel.

An element q of the feature vector v(r,t) may be denoted by $v_q$ (r,t). The values of this element, for the rays that intersect voxel k, may be $V_q(k,t) \equiv \{v_q(r,t)\}_{r \in \rho_k}$. Across viewpoints, the measured variance in this set may be denoted by $VAR[V_q(k,t)]$. An appearance consistency score may be given by $$P_k = \exp(-\Sigma_q\{[V_q(k,t)]\}/\sigma^2), \quad (9)$$

where $\sigma^2$ is a scale parameter. Thus, the total cloud-score for a voxel may be given by $T_k = B_k P_k$.

The resulting simulated 3D cloud field described by the cloud scores determined for multiple voxels $\{T_k\}$ may be a volumetric estimate of cloud occupancy. It may be biased to yield clouds larger than in reality since high-altitude voxels occluded by the cloud-base from all viewpoints may be interpreted as cloudy, since for them $T_k$ is high. This is a realization of a basic ambiguity: if a voxel is occluded from all viewpoints, then there is no way of telling if it is cloudy or not, unless auxiliary or prior knowledge is available. Incorporating a visibility prior may result in smaller clouds in keeping with observed data. If a voxel k is completely occluded by other cloudy voxels, then it may be pruned or carved out using known techniques, such as described in Kutulakos, K., Seitz, S.: A theory of Shape by Space Carving, IJCV 38 (2000) 199-218. In one embodiment, a voxel k may only maintain a value of $T_k$ if there are at least two camera viewpoints from which k is not occluded by other clouded voxels. This pruning may be achieved by iteratively sweeping the field $\{T_k\}$. The resulting pruned 3D cloud occupancy field is denoted by $\{\hat{T}_k\}$. A non-binary (fuzzy) nature may be maintained for $\{\hat{T}_k\}$ to describe the inherent semi-transparency and subtle ambiguity of clouds.

The basic cloud score, step (A), may be determined using any suitable method, such as by using a ratio of image readout at the red/blue color channels, $\tilde{I}^{red}/\tilde{I}^{blue}$, as described in Reconstruction of Cloud Geometry from Multi-View Satellite Images. Remote Sensing of Environment 100 (2006), 143-149, and Cloud Cover Estimation Using Multitemporal Hemisphere Imageries. In: Proc. XXth Congress of the Society for Photogrammetry and Remote Sensing (2004) 818-821. Additionally, sky modeling and machine learning may be applied. In general, in daylight clouds are typically grey (unit red-blue ratio), and the cloudless sky is typically biased to blue (below≈0.8 red-blue ratio). Thus, an exemplary cloud-score per ray (pixel) may be described by:

$$s(r) \begin{cases} \frac{6[\tilde{I}^{red}(r)/\tilde{I}^{blue}(r) - 0.8]}{0.2 + \tilde{I}^{red}(r)/\tilde{I}^{blue}(r)} & \text{if } \tilde{I}^{red}(r)/\tilde{I}^{blue}(r) > 0.8 \\ 0 & \text{otherwise} \end{cases} \quad (10)$$

Here $s \in [0,1]$, where either bound is achieved at gray clouds or blue sky, respectively.

Figure 6B:
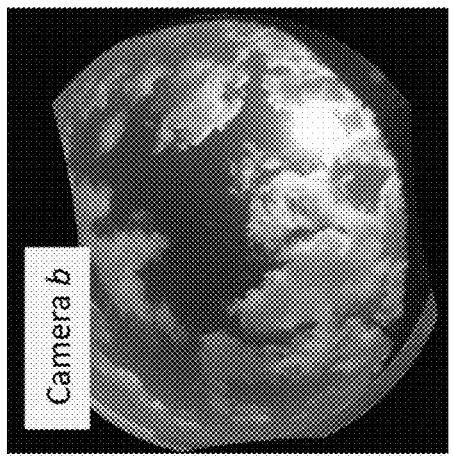
FIGS. 6A-G illustrate an estimation of a cloud field from a set of images captured simultaneously by a network of cameras, in accordance with an embodiment of the invention.
Figure 6D:
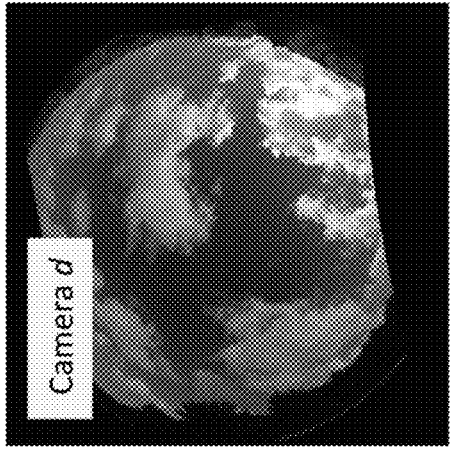
Figure 6A:
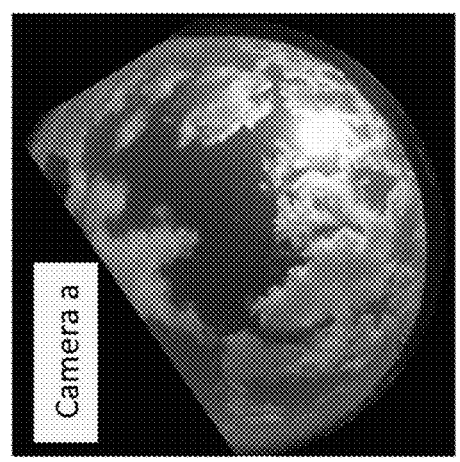
Figure 6C:
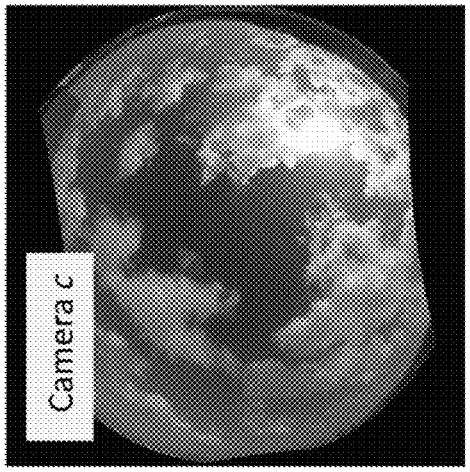
Figure 6F:
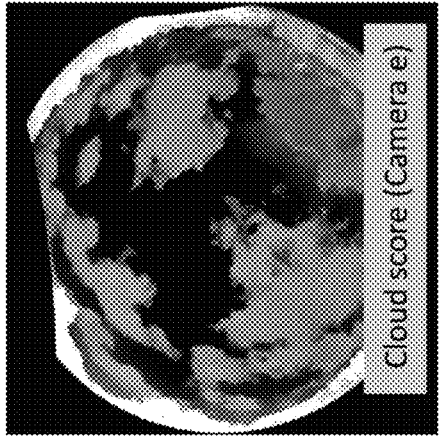
Figure 6E:
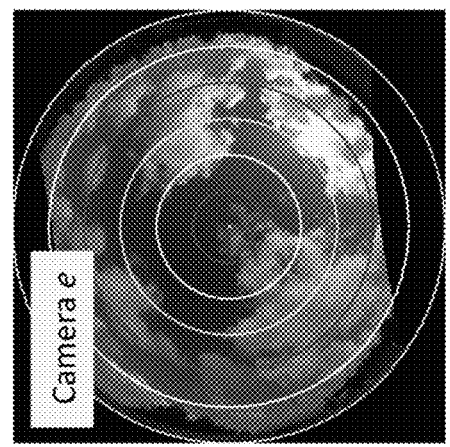

Reference is now made to FIGS. 6A-G, which, taken together, illustrate an estimation of a cloud field from a set of images captured simultaneously by a network of cameras, in accordance with an embodiment of the invention. An exemplary network may comprise five cameras, a, b, c, d, and e, that are geometrically aligned to the zenith and north, and resampled to polar azimuthal equidistant projection in this global system. FIGS. 6A-E illustrate images simultaneously captured by cameras a, b, c, d, and e, respectively, where FIG. 6E shows the image captured by camera e, with overlayed equidistant zenith angle circles on $\tilde{I}_r[l_e, \theta]$. Each camera has dead-regions, shown as black regions on the images, due to roughly centering of the lens-axis.

FIG. 6F shows a cloud score map determined by Eq. 10, corresponding to FIG. 6E, with high values for cloud-pixels, and diminished values for non-cloud pixels.

Figure 6G:
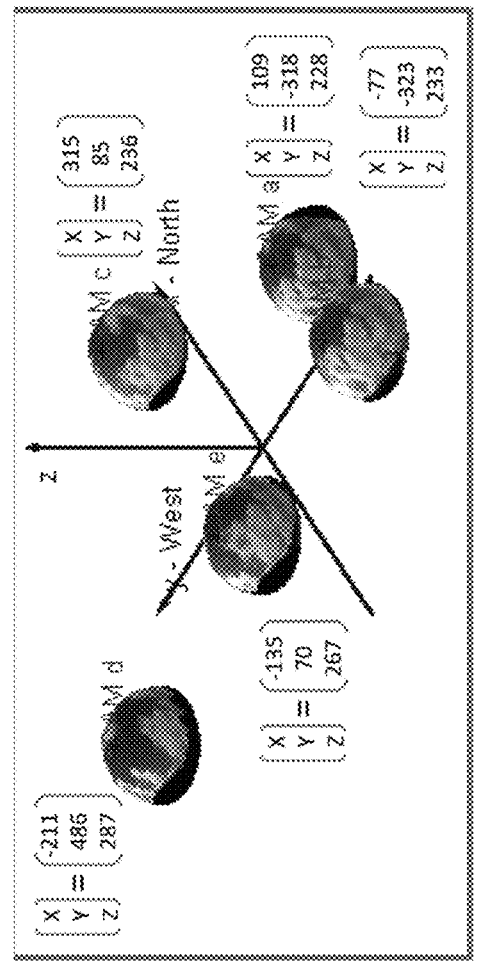

FIG. 6G illustrates the 3D setup of the experimental camera network for producing the results of FIGS. 6A-F. The cameras may be laterally spread over several hundreds of meters, on rooftops at somewhat different heights. The cameras may be very low-cost solar powered camera with coarse alignment tolerances, such as 5 MP Raspberry-Pi camera fitted with a small fisheye lens in place of the OEM lens, and integrated with a Raspberry-Pi computer core providing cellular communication capability, where the gain, response and white-balance may be fixed, thereby avoiding temporal radiometric variations. Due to a coarse lens-to-chip alignment, each camera may have a different peripheral dead-region resulting in a per-node different missing part in the hemispheric view-field, and distinct vignetting. At predefined intervals, such as every thirty seconds, the units may synchronously automatically transmit image data to a network such as the Internet via a cellular network.

Figure 7:
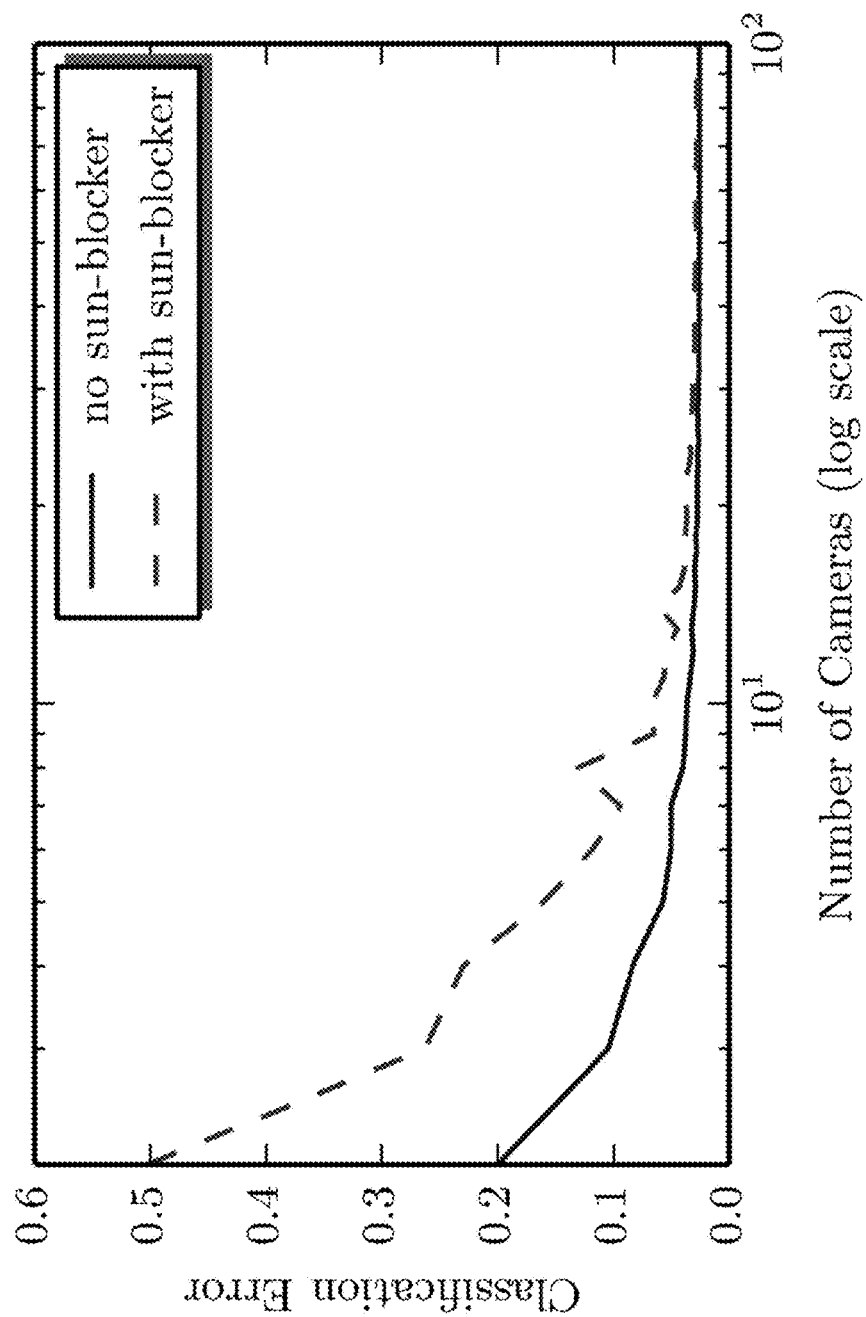
FIG. 7 illustrates cloud classification error rates as a function of a number of cameras included in a camera network, in accordance with an embodiment of the invention.

Reference is now made to FIG. 7 which illustrates cloud classification error rates as a function of the number of cameras included in the network, in accordance with an embodiment of the invention. The solid line in FIG. 7 corresponds to cloud classification error rates for cameras that are not provided with a sun blocker, and the dashed line corresponds to cloud classification error rates for cameras that are provided with a sun blocker.

To quantitatively assess the experimental apparatus described by FIG. 6G, atmospheric-science simulators may be used. An atmosphere may be produced using off-the-shelf large eddy simulation (LES), creating clouds, such as between heights of 500 m to 1500 m. Lighting conditions may be consistent with Copenhagen. Radiative transfer using the discrete ordinate spherical-harmonic method (SH-DOM) may render images taken by 100 cameras placed in a 2.5×2.5 km² domain. Recovery simulations may use random subsets of the network, where the whole network may or may not include a sun blocker. In the LES, a voxel may be considered occupied by cloud if its water-mass parameter is not null. In the recovery, a voxel k may be classified as occupied by cloud if its value for $T_k > 0.01$. The classification error rate may be measured across all the voxels, and the results may be plotted, such as illustrated in FIG. 7. It may be noted, results may improve dramatically when increasing the number of cameras from two to ten, as may be expected of space carving. Even when sun blocker is applied, the algorithm is able to reconstruct the cloud formation. As expected, additional cameras are required to compensate for the limited field of view for each camera.

Figure 8B:
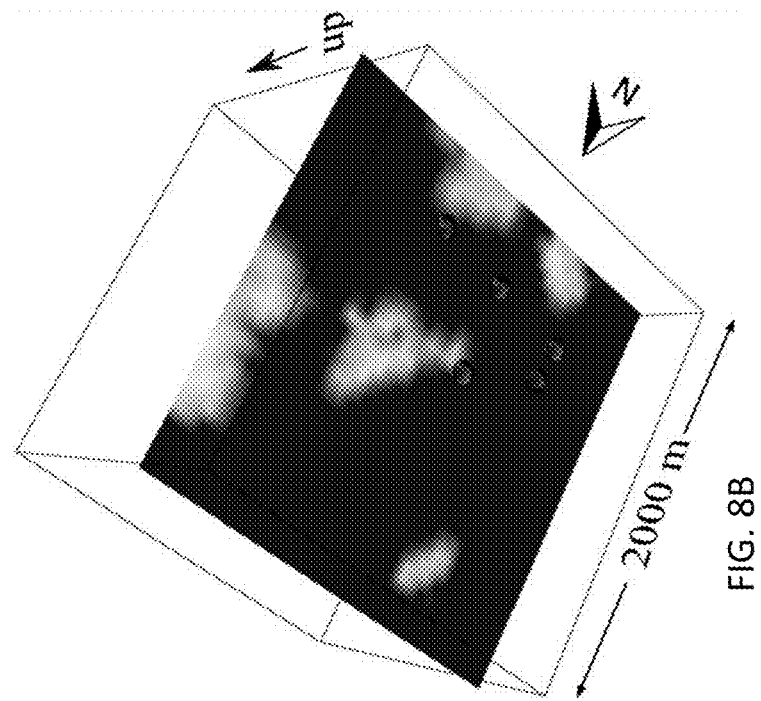
FIGS. 8A-E illustrates exemplary results of a cloud reconstruction experiment, operative in accordance with an embodiment of the invention.
Figure 8A:
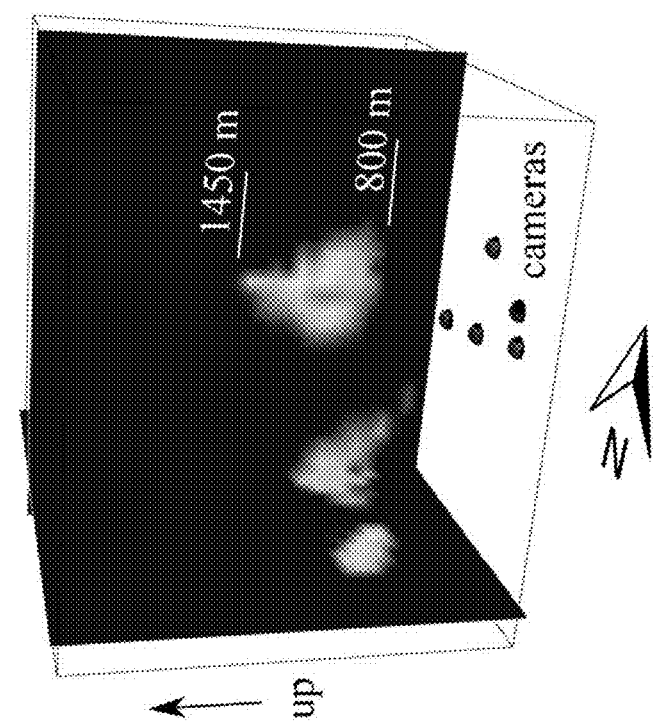
Figure 8D:
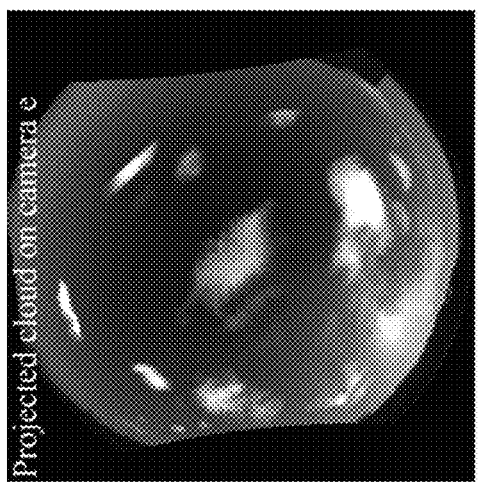
Figure 8E:
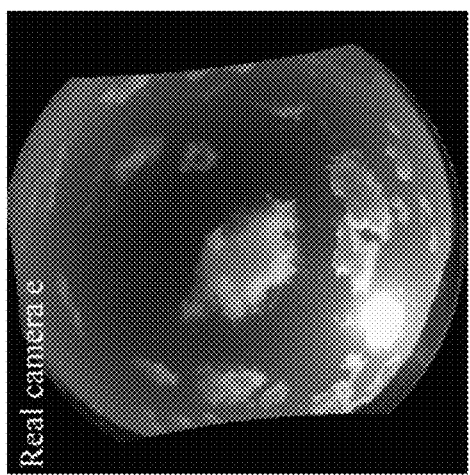
Figure 8C:
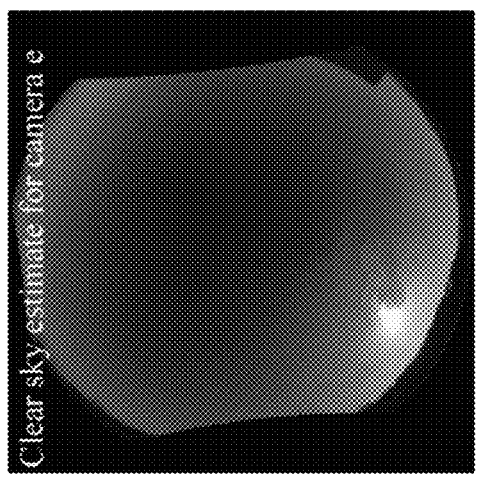
Figure 9C:
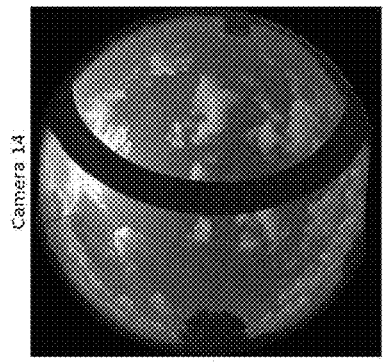
FIGS. 9A-F show a set of sky images simultaneously captured by six of the cameras on Jun. 10, 2015, at approximately 8:40:00 AM.
Figure 9F:
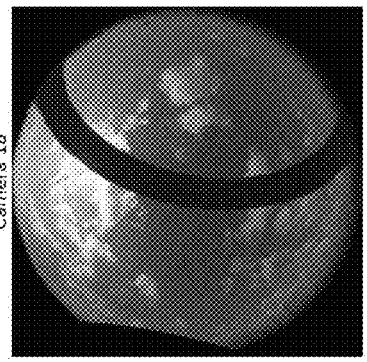
Figure 9B:
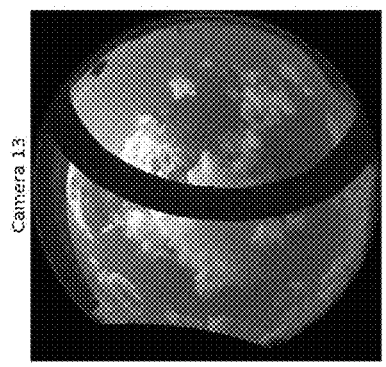
Figure 9E:
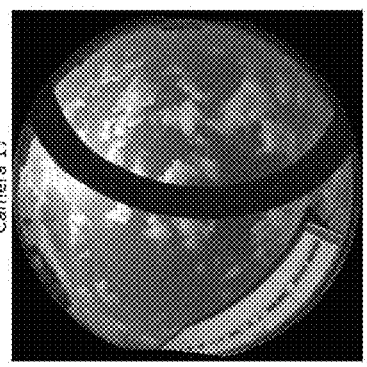
Figure 9A:
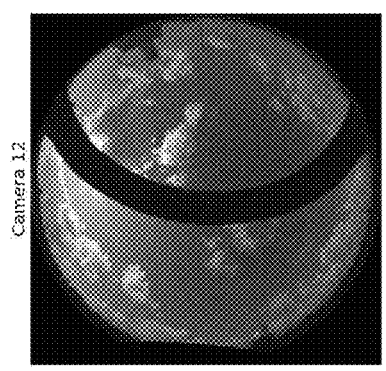
Figure 9D:
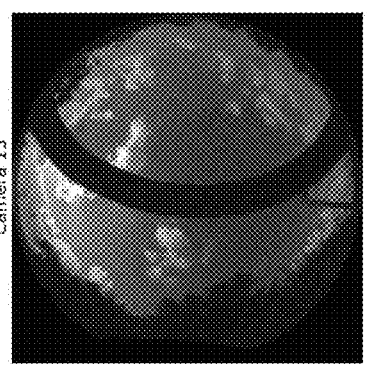
Figure 10C:
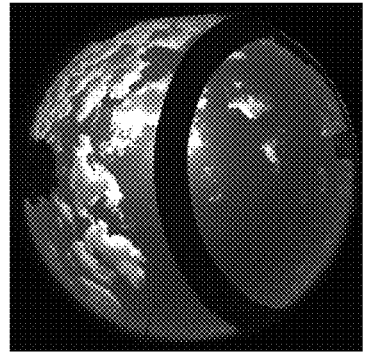
FIGS. 10A-E show a set of sky images simultaneously captured by five of the cameras on Jun. 10, 2015, at approximately 1:40:00 PM.
Figure 10B:
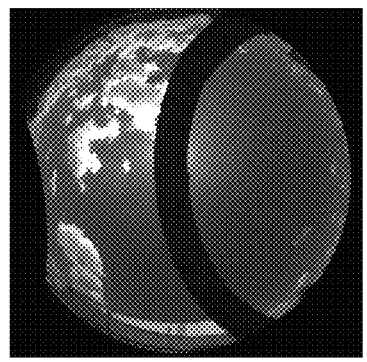
Figure 10E:
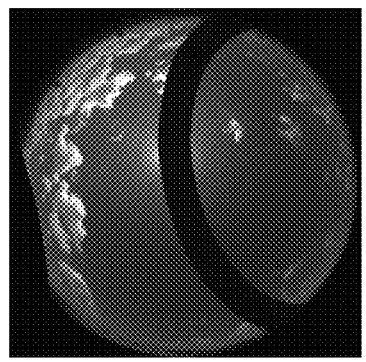
Figure 10A:
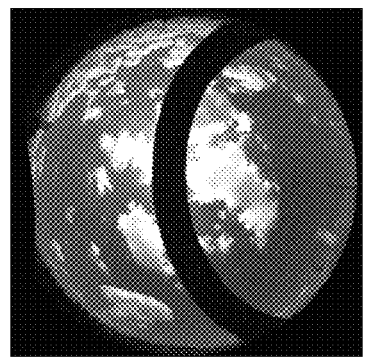
Figure 10D:
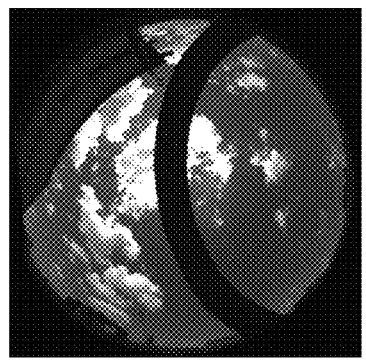
Figure 11A:
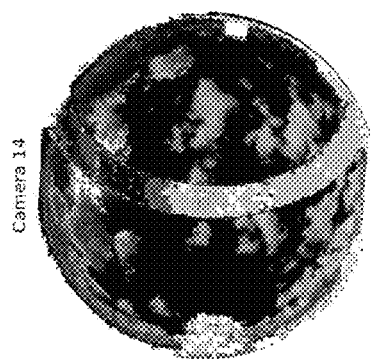
FIGS. 11A-F shows intermediate sky image representations determined using cloud-scores assigned to each pixel of the images of FIGS. 9A-F, and that form the basis for the space-carving cloud shape estimation, where darker shades indicate pixels that are less likely to correspond to a cloud.
Figure 11D:
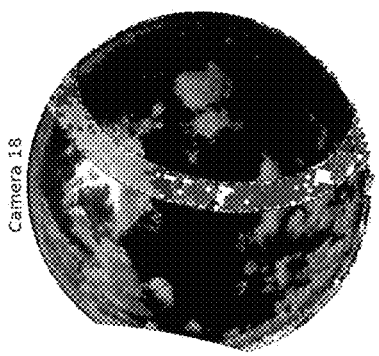
Figure 11B:
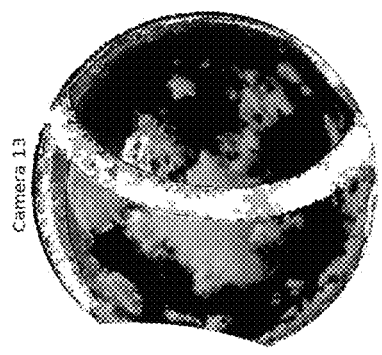
Figure 11E:
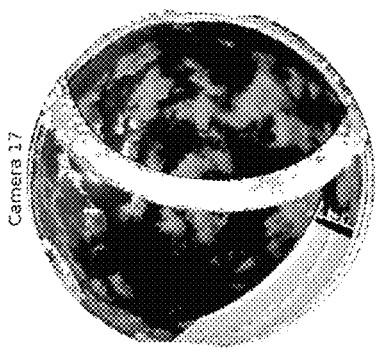
Figure 11C:
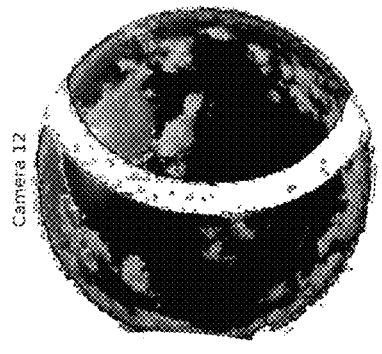
Figure 11F:
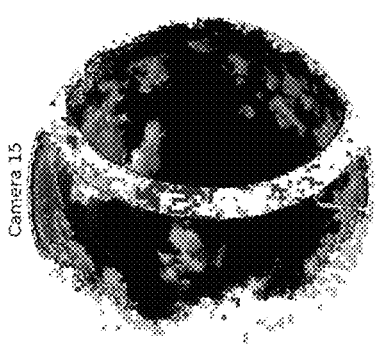

Reference is now made to FIGS. 8A-E which illustrate exemplary results of a cloud reconstruction experiment, operative in accordance with an embodiment of the invention. The methods described above may be applied to various captured images, such as images of cumulus clouds, similar to those seen in FIGS. 6A-F, to construct an image of the sky. FIG. 8A illustrates a layout for one or more cameras in a camera network for capturing one or more images of the sky. FIGS. 8A-B illustrate multiple cross-sections of the recovered cloud-occupancy field $\{\hat{T}_k\}$, where the domain of the clouds may be much larger than the camera network, and cloud altitude may be above sea-level. FIG. 8C, illustrates an estimation of sky-background image based the 3D volumetric cloud-occupancy field $\{\hat{T}_k\}$ that may be derived from the images captured by cameras a, b, c, d. The derived field $\{\hat{T}_k\}$ may be projected to a viewpoint from camera e that was not included in the derivation, and overlayed on the estimated sky-background image, obtained as described above. The resulting synthetic cloud-score image $J[l_e, \theta]$ shown in FIG. 8D may be compared to the image captured by camera e, and shown in FIG. 8E, $\hat{I}_r[l_e, \theta]$.

Accounting for the altitude of the cameras above sea-level, the clouds mainly reside between 800 m to 1450 m above Sea-level. Two indicators may be used to validate the results. The first indicator may be obtained from worldwide balloon-based radiosonde measurements including quantitative vertical humidity profiles, and cross validating the 3D. In one experiment, the radiosonde indicated a layer of high humidity that can yield clouds in the range [770, 1881] m above sea-level, consistent with the clouds estimated above.

A second method for validating the results may be to cross-validate a 3D cloud recovery with a missing field of view. For example, as shown in FIGS. 8A-E, four cameras (indexed a, b, c, d) out of five, may be used to estimate a 3D cloud recovery. The resulting estimated 3D cloud distribution obtained from cameras a, b, c, d may be projected onto a viewpoint corresponding to camera e. The resulting projected cloud recovery may be compared to an image of the sky captured by camera e to determine error.

The values of field $\{\hat{T}_k\}$ may be aggregated for the voxels intersected by a given ray corresponding to $[l_e, \theta]$, such as by ray-casting. The resulting cloud-score image $w[l_e, \theta]$ may be applied to Eq. (10) to estimate a sky-background image by using it as an α-map as follows:

$$\alpha[l_e, \theta] = \begin{cases} 2w[l_e, \theta] & \text{if } 2w[l_e, \theta] < 1 \\ 1 & \text{otherwise} \end{cases} \quad (11)$$

The rendered image is then $J[l_e, \theta] = \alpha[l_e, \theta] + (1-\alpha[l_e, \theta])\text{SKY}(\theta)$. This image does not pretend to properly render clouds in their true shades and effect on the sky. It simply served to visualize the result, as shown in FIG. 8D. It may be compared to the captured corresponding image $\hat{I}_r[l_e, \theta]$, shown in FIG. 8E. This rendering relies on the redundancy of the network. Even if a viewpoint is blocked, much of its information can be derived using other viewpoints compounded with 3D recovery.

Experimental Results

The following experimental results validate the system and method described above in a controlled field experiment that compared estimated cloud altitude values obtained from a network of cameras with ground-truth measurements obtained from a laser-range ceilometer located at the airport in Haifa, Israel. Seven sky cameras were positioned in proximity to the ceilometer at different locations in the Haifa Bay area. The cameras were positioned at aerial distances of approximately: 650 meters (m), 910 m, 1050 m, 1,200 m, 1,450 m, 1470 m, and 1,820 m, from the ceilometer. The three-dimensional position coordinates for each camera were measure using a GPS and recorded. The orientation of the cameras, as described by three rotational angles, were calibrated using tracks of the moon in the evening before the batteries of the cameras shut down.

The cameras ran unattended for several weeks and transmitted captured images of the sky as described above. FIGS. 9A-F, and 10A-E two such sets of images: FIGS. 9A-F show images simultaneously captured by six cameras on Jun. 10, 2015 at 8:40:00 AM, and FIGS. 10A-E show images simultaneously captured by five cameras on Jun. 10, 2015 at 1:40 PM. Some images were not communicated due to a problem with communication. The curved dark bands seen in each image are a result of the static sun-occluder provided with each camera to block direct sunlight.

Simultaneously to capturing images of the sky, cloud-base altitude was measured once per minute by the ceilometer positioned nearby. The recorded measurements correspond to the minimal cloud-base altitude measurement obtained within each minute-long temporal window, where a value of zero indicates that no cloud was measured. The ceilometer was able to simultaneously measure the base-altitudes of up to three vertically layered clouds positioned directly above the ceilometer instrument. Table 1 (below) shows the measurements recorded on Jun. 10, 2015, at approximately 1:40 PM.

TABLE 1

Data acquired from the ceilometer on Jun. 10, 2015 at approximately 1:40 PM. The clock on the ceilometer is offset by one hour relative to the local time, the bias of which has been corrected. Altitude above sea level is in feet: 3330 feet correspond to 1015 meters.

| Altitude ($3^{rd}$) | Altitude ($2^{nd}$) | Altitude ($1^{st}$) | Hour | Date-day |
|---|---|---|---|---|
| 0 | 0 | 3400 | 13:33 | 10 |
| 0 | 0 | 3300 | 13:34 | 10 |
| 0 | 0 | 0 | 13:35 | 10 |
| 0 | 0 | 0 | 13:36 | 10 |
| 0 | 0 | 2980 | 13:37 | 10 |
| 0 | 0 | 3010 | 13:38 | 10 |
| 0 | 0 | 3490 | 13:39 | 10 |
| 0 | 0 | 3330 | 13:40 | 10 |
| 0 | 0 | 0 | 13:41 | 10 |
| 0 | 0 | 0 | 13:42 | 10 |
| 0 | 0 | 0 | 13:43 | 10 |
| 0 | 0 | 2890 | 13:44 | 10 |
| 0 | 0 | 2980 | 13:45 | 10 |
| 0 | 0 | 3170 | 13:46 | 10 |
| 0 | 0 | 0 | 13:47 | 10 |
| 0 | 0 | 0 | 13:48 | 10 |
| 0 | 0 | 0 | 13:49 | 10 |
| 0 | 0 | 2980 | 13:50 | 10 |
| 0 | 0 | 2950 | 13:51 | 10 |

The raw images were corrected for geometric (angular) misalignment using the lunar-based orientation calibration of the cameras. Then, the sky images were processed as described above. A cloud-score was assigned to each pixel in each captured image for each camera at each time instant, resulting in an intermediate representation of the sky images, an example of which is shown in FIGS. 11A-F. Space carving was then performed, as described above.

Figure 12:
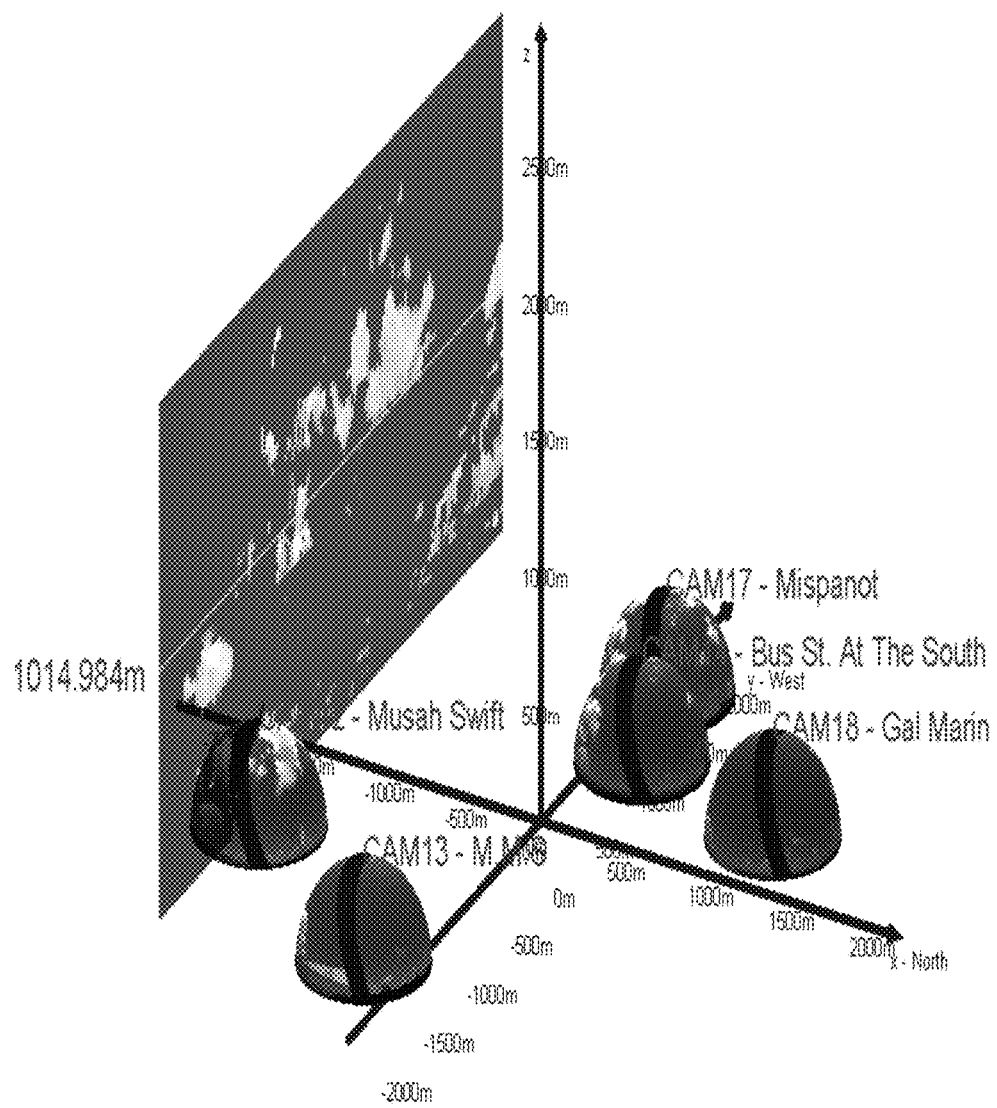
FIG. 12 displays the layout of five of the cameras and the estimated 3D cloud field derived from FIGS. 10A-E, shown as a vertical planar cross section of the estimated cloud field with the recorded ceilometer-read altitude at that time, and corresponding to the results of Table 1.
Figure 13:
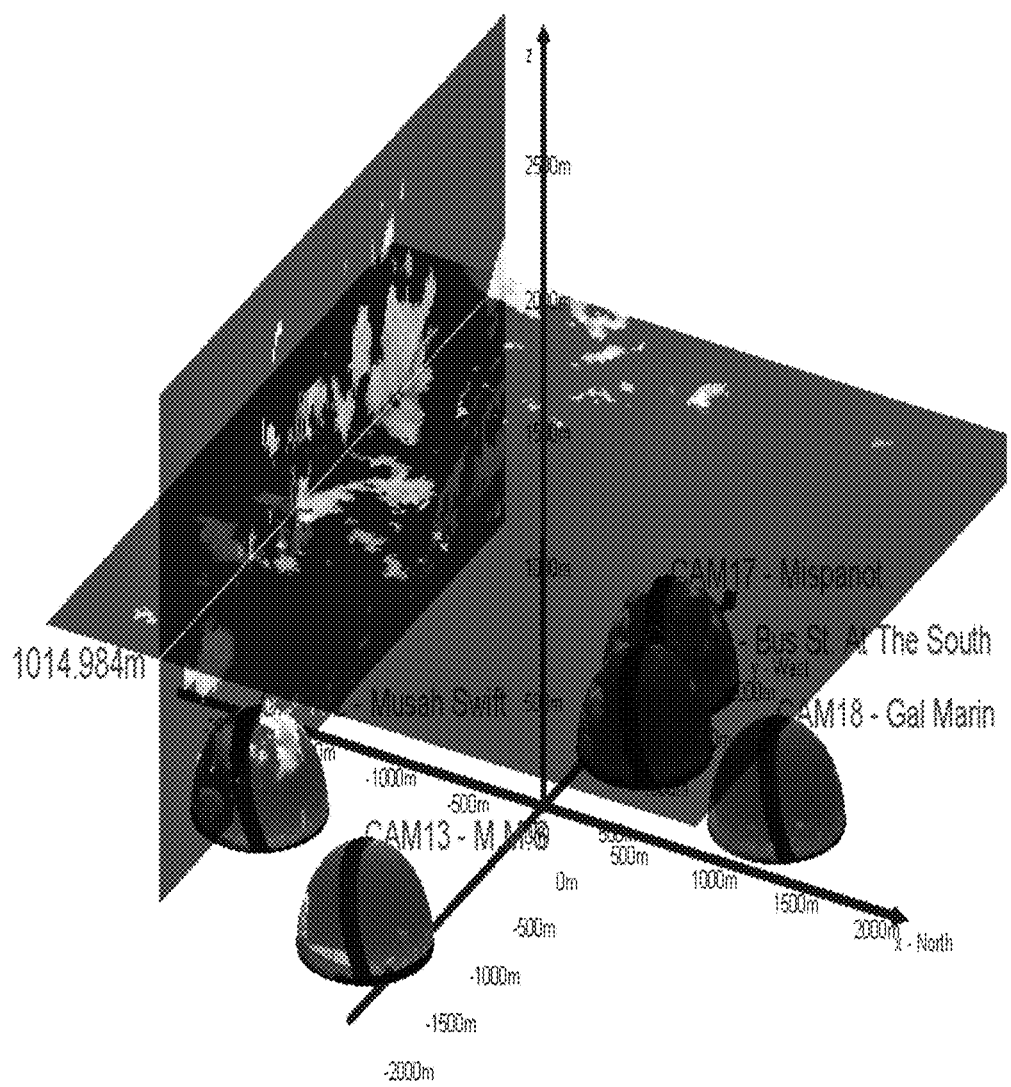
FIG. 13 displays the layout of five of the cameras and the estimated 3D cloud field derived from the data of FIGS. 10A-E, shown as two planar cross sections of the cloud field: a vertical plane as shown in FIG. 12, and a horizontal plane positioned at the recorded ceilometer-read altitude and corresponding to the results of Table 1.

The result of the space-carving yielded a 3D cloud-opacity field which was directly compared to the ceilometer data obtained at that time. Referring to FIGS. 12-13, the camera layout is shown with the results of the 3D estimated cloud field calculated using the methods described above, and which correspond to the data of FIGS. 10A-E and Table 1. Results are indicated by the planar cross sections of the cloud field in FIGS. 12-13, and the recorded ceilometer-read cloud-base altitude at that time. As can be seen from FIGS. 12-13, there is agreement between the ceilometer acquired cloud-base altitude of 3330 feet (1014.984 meters) and the cloud-bases determined from the recovered 3D cloud field.

The present invention may be a system, a method, and/or a computer program product. The computer program product may include a computer readable storage medium (or media) having computer readable program instructions thereon for causing a processor to carry out aspects of the present invention.

The computer readable storage medium can be a non-transitory, tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for wide-scale light field imaging, the system comprising:
    a network of multiple terrestrial cameras positioned at multiple known locations, wherein each of said cameras comprises:
    a lens directed towards the sky, such that the camera is configured to capture one or more images of the sky, and
    a processor configured to:
        (a) operate a wired and/or wireless communications infrastructure for transmitting said captured images,
        (b) geometrically calibrate the camera, by:
            obtaining the location of the camera with respect to a global coordinate system,
            obtaining, from an astronomical chart, a zenith and an azimuth of an extraterrestrial object with respect to the location of the camera and as a function of time, and
            repeatedly determining a yaw-pitch-roll angle vector of the camera based on the location of the camera and the zenith and azimuth of the extraterrestrial object as time progresses; and
    a server configured to:
        (a) receive said transmitted images and information on the geometrical calibration of the cameras, and
        (b) jointly process said received images based on the geometrical calibration of the cameras, the processing comprising differentiating pixels depicting the sky from pixels depicting clouds by statistically analyzing the received images over time,
    thereby producing a wide-scale light field image of the sky, wherein said wide-scale light field image of the sky is a three dimensional estimation of a cloud field of the sky.

2. The system of claim 1, wherein said server is further configured to process said images by applying a regional stationarity assumption for analyzing said received images.

3. The system of claim 1, wherein said cameras are radiometrically calibrated with respect to a temporal median calculated for a color channel of said cameras.

4. The system of claim 1, wherein said cameras are radiometrically calibrated with respect to a median gain of said cameras.

5. The system of claim 1, wherein said cameras are provided with a static sun blocker.

6. The system of claim 5, wherein the position and size of each of said static sun blockers of each one of said multiple cameras is configured to block the Sun's rays from directly illuminating said lens of said one camera.

7. The system of claim 6, wherein each one of said sun blockers of said cameras corresponds to a blocked portion of said sky that is associated with said one sun blocker, and wherein at least another one of said cameras included in said network is configured to capture an image of said blocked portion of said sky associated with said one sun blocker, thereby producing said wide-scale light field image including all portions of said sky.

8. The system of claim 1, wherein said server is further configured to compare said produced light field image of said sky against a simulated image of said sky.

9. The system of claim 1, and further comprising a diffraction grating positioned in a field of view of at least one of said cameras thereby dispersing one or more incoming light rays to measure a spectra of said incoming light rays.

10. The system of claim 1, wherein said server is further configured to process said received images thereby determining that an object that is expected to be indicated by a given pixel corresponding to an incoming light ray r, is not indicated by the pixel because a cloud is blocking said ray.

11. A method for wide-scale light field imaging, the method comprising:
positioning a network of multiple terrestrial cameras at multiple known locations;
capturing one or more images of the sky via a lens directed towards the sky that is configured with each of said cameras; and
transmitting said captured images, via a processor that is configured with each of said cameras, to operate at least one of a wired and a wireless communications infrastructure, to a server;
geometrically calibrating each of said cameras, via the processor that is configured with the camera, by:
obtaining the location of the camera with respect to a global coordinate system,
obtaining, from an astronomical chart, a zenith and an azimuth of an extraterrestrial object with respect to the location of the camera and as a function of time, and
repeatedly determining a yaw-pitch-roll angle vector of the camera based on the location of the camera and the zenith and azimuth of the extraterrestrial object as time progresses; and
at the server:
receiving said transmitted images and information on the geometrical calibration of the cameras, and
jointly processing said received images based on the geometrical calibration of the cameras, the processing comprising differentiating pixels depicting the sky from pixels depicting clouds by statistically analyzing the received images over time,
thereby producing a wide-scale light field image of the sky, wherein said wide-scale light field image of the sky is a three dimensional estimation of a cloud field of the sky.

12. The method of claim 11, further comprising processing said images by applying a regional stationarity assumption for analyzing said received images.

13. The method of claim 11, further comprising radiometrically calibrating said cameras with respect to a temporal median calculated for a color channel of said cameras.

14. The method of claim 11, further comprising radiometrically calibrating said cameras with respect to a median gain of said cameras.

15. The method of claim 11, further comprising providing each of said cameras with a static sun blocker.

16. The method of claim 15, wherein the position and size of each of said static sun blockers of each one of said multiple cameras is configured to block the Sun's rays from directly illuminating said lens of said one camera.

17. The method of claim 16, wherein each one of said sun blockers of said cameras corresponds to a blocked portion of said sky that is associated with said one sun blocker, and wherein at least another one of said cameras included in said network is configured to capture an image of said blocked portion of said sky associated with said one sun blocker, thereby producing said wide-scale light field image including all portions of said sky.

18. The method of claim 11, further comprising comparing said produced light field image of said sky against a simulated image of said sky.

19. The method of claim 11, further comprising positioning a diffraction grating in a field of view of at least one of said cameras thereby dispersing one or more incoming light rays to measure a spectra of said incoming light rays.

20. The method of claim 11, further comprising processing said received images thereby determining that an object that is expected to be indicated by a given pixel corresponding to an incoming light ray r, is not indicated by the pixel because a cloud is blocking said ray.

* * * * *